United States Patent Office 3,041,324
Patented June 26, 1962

3,041,324
POLYMERIZATION OF OLEFINIC COMPOUNDS IN THE PRESENCE OF CATALYSTS HAVING A TRIALKYL BORON BASE
Robert De Coene and Alexis Mathieu, Brussels, Belgium, assignors to Solvic Societe Anonyme, Brussels, Belgium, a Belgian company
No Drawing. Filed July 28, 1959, Ser. No. 829,960
1 Claim. (Cl. 260—92.8)

The present invention relates to an improved process of polymerization and/or copolymerization of compounds containing at least one ethylenic double bond wherein use is made of especially active new catalytic systems having a trialkyl boron base, which are capable of permitting the polymerization and/or copolymerization of the said compounds at low temperatures, under atmospheric pressure.

According to Belgian Patents Nos. 560,624, 562,433 and 562,701, it is known to be possible to polymerize and/or copolymerize compounds containing the group $>C=C<$ at low temperatures and under atmospheric pressure in the presence of organic boron compounds corresponding to the general formula $BR_3$ wherein R represents an alkyl group. The polymers and/or copolymers obtained in accordance with these patents exhibit improved mechanical properties and possess a high crystallinity index.

It has now been noted that it is possible to substantially increase the activity of catalysts with a trialkyl boron base for the polymerization and/or copolymerization of compounds containing a double ethylene bond by the addition of suitable activators to the said catalysts.

The improved process forming the subject of the present invention consists in polymerizing and/or copolymerizing compounds corresponding to the general formula

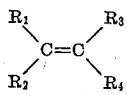

wherein $R_1$, $R_2$, $R_3$ and $R_4$ represent hydrogen, linear or cyclic hydrocarbon radicals, saturated or non-saturated, heterocyclic radicals, hydrocarbon radicals substituted with halogens, polar atoms and/or groups such as halogens, ester, ether, —CN groups, in the presence of a catalyst constituted by organic boron derivatives corresponding to the general formula $BR_3$ wherein R is an alkyl radical, and of a small quantity of radical catalysts.

The radical catalysts are selected from the group comprising the usual radical catalysts such as peroxides or azodinitriles. For example benzoyl, lauroyl, 2-4 dichlorobenzoyl peroxides may be used, and azodinitriles such as azodi-isobutyronitrile. The amount of radical catalyst to be employed may be from 0.3 to 3% by weight of the amount of the monomer or monomers to be polymerized.

Among the compounds capable of being polymerized in the presence of such catalytic systems may be mentioned inter alia olefins such as ethylene, propylene and butylene, iso-olefins, dienic hydrocarbons, styrene and its nuclear substitution derivatives; vinyl chloride, vinylidene chloride, trichlorothylene, perchloroethylene, vinyl fluoride, vinylidene fluoride, trifluoroethylene, perfluoroethylene, chlorotrifluoroethylene, chlorofluoroethylenes, the vinyl esters such as vinyl acetate, vinyl ethers, acrylic acid esters and esters of acrylic acid substitution products with halogens, esters of methacrylic acid and its substitution products with halogens, allyl esters and halogenides, acrylic nitrile, methacrylic nitrile, vinylpyridine, etc.

Monomers corresponding to the general formula indicated hereinabove can likewise be copolymerized among themselves in accordance with the present process. In this way binary or ternary copolymers are obtained, depending on the operating conditions.

The amount of boron trialkyl catalyst to be used may vary between 0.1 and 3% by weight of the amount of the monomer or monomers employed.

Bulk polymerization may be carried out or the polymerization may proceed in an inert organic medium. Since trialkyl derivatives of boron are not particularly sensitive to the action of water, the polymerization may likewise be effected in an aqueous medium according to the well known techniques known as "emulsion" polymerization or "pearl" polymerization. The organic boron derivaties chosen are, preferably, triethyl boron or normal tributyl boron.

The catalytic system used according to the present invention permits polymerization and/or copolymerization of compounds containing at least one ethylenic double bond, such as those described hereinabove, at extremely low temperatures, yet with still appreciable yields. The polymers and copolymers obtained in accordance with the present process generally have a high degree of crystallinity and better mechanical properties as compared with polymers and copolymers prepared by the customary techniques.

The invention is explained in detail with reference to the following examples, which are given solely by way of illustration and do not in any sense limit the scope of the invention. The latter may be modified within the said scope.

Example 1

This example is given by way of comparison. In a 3-neck balloon flask with a capacity of 1 liter provided with a stirring device, a thermometric sheath and a nitrogen inlet, are placed, after the air has been driven out with a current of nitrogen, 500 g. of vinyl chloride and 50 g. of normal hexane maintained at —25° C. To this are added 0.75 g. of normal tributyl boron. The temperature is kept at —25° C. and after 2 hours of polymerization, 27 g. of polyvinyl chloride are collected.

Example 2

The operation proceeds as in Example 1, but 1 g. of 2-4 dichlorobenzoyl peroxide is added to the reactive medium. After 2 hours of polymerization at —25° C., 36 g. of polyvinyl chloride are obtained.

Example 3

The operation proceeds as in Example 1, but 1 g. of azodi-isobutyronitrile is added to the reactive medium. After 2 hours of polymerization at —25° C., 42 g. of polyvinyl chloride are obtained.

We claim:
A method of producing polyvinyl chloride which comprises polymerizing vinyl chloride in contact with 0.1 to 3% by weight of a catalyst which is an organic boron derivative corresponding to the general formula $BR_3$ wherein R is an alkyl radical and in contact with 0.3 to 3% by weight of azodiisobutyronitrile as activator.

References Cited in the file of this patent
UNITED STATES PATENTS
2,842,474   Pratt _____ July 8, 1958
OTHER REFERENCES
J. Poly. Sci., vol. 28, pages 227–229 (1958).